APPARATUS FOR WELL LOGGING BY MEASURING AND COMPARING POTENTIALS CAUSED BY SONIC EXCITATION
Original Filed June 12, 1969
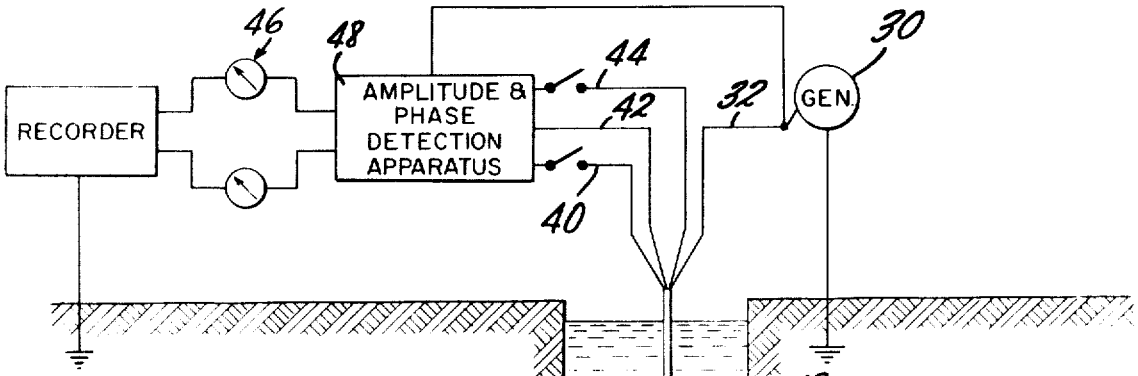
FIG. 1
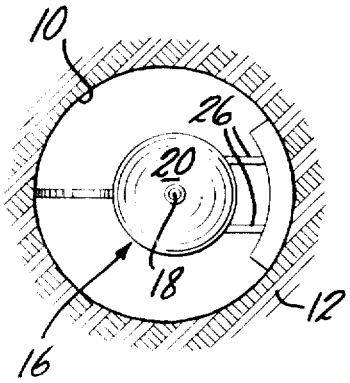
FIG. 2
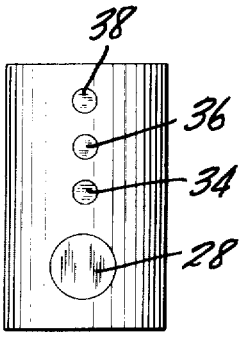
FIG. 3
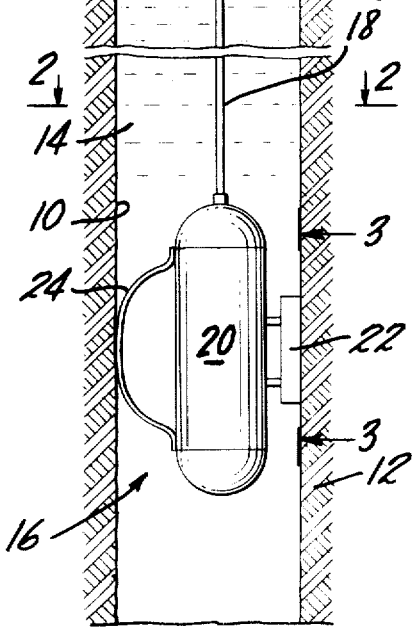

United States Patent Office

Re. 28,264
Reissued Dec. 3, 1974

28,264

APPARATUS FOR WELL LOGGING BY MEASURING AND COMPARING POTENTIALS CAUSED BY SONIC EXCITATION

Adelbert Semmelink, St. James, Cape, South Africa, assignor to Schlumberger Technology Corporation, Houston, Tex.

Original No. 3,599,085, dated Aug. 10, 1971, Ser. No. 832,679, June 12, 1969. Application for reissue Aug. 7, 1973, Ser. No. 386,449

Int. Cl. G01v *3/18*

U.S. Cl. 324—1 11 Claims

Matter enclosed in heavy brackets [ ] appears in the original patent but forms no part of this reissue specification; matter printed in italics indicates the additions made by reissue.

ABSTRACT OF THE DISCLOSURE

A sonic transducer in contact with the surface of a formation traversed by a bore hole periodically excites the formation at low frequencies to cause periodic flow of the formation fluid and therefore periodic electrokinetic potentials to be created in the formation. The potentials are measured at a location near the transducer and at least at one other location spaced from the transducer, and the ratio *or phase difference* of the measured potentials provides knowledge of the electrokinetic skin depth of the formation and thus of the [relative] *comparative* and actual permeability of the formation.

BACKGROUND OF THE INVENTION

The present invention relates to methods and apparatus for investigating the permeability of earth formations traversed by a bore hole, and more particularly to novel and improved methods and apparatus for determining the relative or actual permeabilities of the formations by obtaining indications of the rate of fall-off in fluid velocity in a formation, and of the electrokinetic skin depth of fluid flow in a formation, by applying low-frequency sonic energy to the formation surface and measuring the resulting electrokinetic potentials generated in the formation at selected locations.

Heretofore, information relating to the location and permeability of subsurface earth formations has been obtained by electrical logging methods which are based at least in part on the electrokinetic potential phenomenon that occurs when relative movement is induced between a formation and the fluid contained in the matrices of the formation material. For example, in the U.S. Pat. No. 2,814,017, issued November 19, 1957 to Henri-Georges Doll and assigned to the assignee of this invention, methods are described for investigating the permeabilities of earth formations by observing the differences in phase between periodic pressure waves passed through the formations and the potentials generated by the oscillatory motion of the formation fluid caused by these pressure waves. Conversely, a periodically varying electric current can be used to generate oscillatory motion of the formation fluid, which in turn generates periodic pressure waves in the formation. Measurements can be readily made of the phase displacement between the generating and the generated quantities and a direct indication of the relative permeability of the formation thereby obtained.

Although these methods yield useful data relating to the permeability of subsurface formations and, accordingly, have been a significant contribution to the art, it is desirable to obtain permeability information through other methods and, more particularly, through the measurement of the magnitudes *or phases* of *periodic* electrokinetic potentials generated in a formation by low-frequency sonic excitation of the formation surface. By using [low - excitation frequency] *low - frequency excitation* methods, significant advantages are realized, including eliminating the need of a bore hole pressure probe and minimizing the effects of mud filter cakes on electrical logging techniques.

It has been discovered that the application of low-frequency sonic energy to a formation surface creates large electrokinetic, or streaming, pulses in the immediate area of the sonic generator. This voltage distribution may be visualized as being caused by periodic radially directed surges of fluid in the formation resulting from the localized periodic compression, or "squeezing," of the formation surface at the area of contact with the sonic generator. The flow in question may be considered to be similar to an alternating double layer of small radial extent having a thickness of the order of the electrokinetic skin depth of fluid flow in the formation. Electrokinetic skin depth, moreover, is defined as the distance in which the relative motion of flow in the outward sense diminishes by a factor of 1/e, where e is the natural logarithm base, a value of approximately 2.72.

In any event, the [streaming potential] *sonic* pulses generate periodic movements of the formation fluid which produce detectable transient electrokinetic potentials of the same frequency as the applied sonic energy and having magnitudes at any given location *that are* directly proportional to the velocity of the fluid motion at that locaction and [inversely proportional to the square of the distance from the locus of the streaming potential pulse] *that fall off with increasing length of travel through the formation.* Since the fluid velocity necessarily falls off from its initial value with increasing length of travel through the formation at a rate dependent in part upon the permeability of the formation rock, it will be appreciated that the magnitude of the electrokinetic potential at any given distance from the streaming pulse *generator* will be an indication of formation permeability. Thus, a high-electrokinetic skin depth would be indicative of a large relative movement between the formation and the formation fluid and a high permeability, while a low-electrokinetic skin depth at the same location would indicate that the formation is constituted of relatively impermeable material.

[By obtaining measurements, while the formation is excited, of the magnitudes of the electrokinetic potentials existing at one or more fixed locations spaced from the sonic generator, and thus from the streaming potential pulses, and referencing them to the magnitude of the streaming pulses,] *By exciting the formation with a sonic generator and making a magnitude or phase comparison of the electrokinetic potentials as measured at positions which are at different distances from the sonic generator,* it is possible to obtain data indicative of the rate of fall-off in fluid velocity. These data may be compared with similar data from formations of known permeability, such as formations which have been investigated by core analysis, for example, to make a qualitative determination of the [relative] *comparative* permeability of the formation being investigated.

It is also possible to determine actual permeabilities, and to facilitate the development of [relative] *comparative* permeability data, by relating the fluid velocity fall-off measurements to the electrokinetic skin depth of fluid flow in the formation. Although the exact nature of the physical relationship between the measured quantities and the skin depth is not known, specific values can be measured experimentally. For example, [one-diminsional] *one-dimensional* laboratory tests indicate that the measured potential falls off as a function of $e^{-z/\delta}$, where z is the distance between the point of measurement and the sonic generator, and $\delta$ is the electrokinetic skin depth. Other studies that more closely approximate bore hole conditions, however, seem to show that the potential decreases in accordance with an inverse power law series. In any case, notwithstanding the physical character of the phenomenon, the [ratio] *comparison* of the electrokinetic [potential magnitudes] *potentials* at spaced locations from the sonic generator [to the magnitude of the streaming pulse] is known to be related to the skin depth in a manner which can be determined experimentally.

Turning once more to the [linear] *one-dimensional* flow situation, the average flow rate of the fluid in the formation can be expressed as follows, through a solution of the well known diffusion equation:

$$[\bar{q}=\bar{q}_o e^{1z/\delta} \cos (\omega+z/\delta)]$$

$$\bar{q}=\bar{q}_0 e^{-\frac{z}{\delta}} \cos \left(\omega t-\frac{z}{\delta}\right)$$

where $\bar{q}$ is the average flow rate of the fluid at a depth z from the formation surface

[o]$\bar{q}_0$ is the average flow rate of the fluid at the formation surface, i.e. z=0 z is the [depth] *distance of the measurement electrode* from the [formation surface] *sonic generator*

$\delta$ is the electrokinetic skin depth $\omega$ is the product of $2\pi$ and the sonic frequency [.]

*t is time.*

The electrokinetic skin depth can then be expressed as:

$$\left[\delta=\sqrt{\frac{2k\rho}{\omega\mu\phi}}\right]$$

$$\delta=c\sqrt{\frac{2k\rho}{\omega\mu\phi}}$$

where $\delta$ is the skin depth c is sound velocity in the (bulk) fluid k is the formation permeability $\rho$ is the fluid density $\mu$ is the viscosity of the formation fluid $\omega$ is the product of $2\pi$ and the sonic frequency $\phi$ is the formation porosity.

Expressing the [potential ratios] *potentials* in terms of the skin depth is particularly useful, therefore, in that it allows calculation, by solution of the above equation, of the actual permeability of the formation tested. Obviously, the viscosity and density of the formation fluid, the sound velocity in the formation fluid and the porosity of the formation material must be known in order to determine the actual permeability. This information can be obtained through conventional techniques.

SUMMARY OF THE INVENTION

There are provided, in accordance with the invention, methods and apparatus for determining the actual or [relative] *comparative* permeability of sub-surface earth formations, including the steps of applying sonic energy to the surface of a formation to cause periodic motion of the formation fluid, and thereby periodic electrokinetic potentials, to be created in the formation, and measuring the magnitudes *or phases* of the electrokinetic potentials near the location where the sonic energy is applied and at least at one other location in nearby spaced relation to the sonic generator to obtain indications of the rate of fall-off in fluid velocity and of the electrokinetic skin depth of fluid flow in the formation. Preferably the sonic generator is positioned at a number of depths along any given formation and the formation is excited at each depth at a plurality of separate frequencies. By comparing the indications thus obtained with similar indications from earth formations of known permeability, the [relative] *comparative* permeability of the formations investigated can be determined.

More specifically, a method of investigating earth formations according to the present invention includes positioning a sonic transducer in contact with the surface of a formation to be investigated and applying sonic energy to the formation at frequencies within the range of from 20 to 500 c.p.s. to cause periodic fluid flow and thereby periodic electrokinetic potentials to be created in the formation. These potentials are detected by an electrode system, which includes a center electrode positioned closely adjacent the transducer, a [ground] *common* electrode and at least one outer electrode disposed at a location spaced from the transducer, and [their respective magnitudes] *respectively* recorded by suitable instrumentation at the earth's surface. The outer electrode may, for example, be located within three electrokinetic skin depths of the transducer.

[The ratio] *A comparison* of the electrokinetic potential at each spaced electrode to [the magnitude of] the potential at the center electrode is then [determined] *made* for each excitation frequency to obtain an indication of the rate of fall-off in fluid velocity between the source of excitation energy and the location of the spaced electrodes, which indications are then compared with the fall-off rates of formations of known permeability to make qualitative determinations of the [relative] *comparative* permeability of the formation tested.

Since the [ratios of the] electrokinetic [potential magnitudes] *potentials* at the spaced electrodes and the transducer electrode can be related experimentally to the electrokinetic skin depth of the formation, it is possible to calculate the actual permeability of the formation if the viscosity, density and sound velocity of the formation fluid are known and the porosity of the formation material is known. If the viscosity is not known, the specific permeability, i.e. $k/\mu$, can be derived. In many instances, specific permeability may be a more useful logging parameter than permeability.

Also, the measured quantities can be indicated and recorded directly as skin depth values to facilitate comparison with the skin depth values of previously investigated formations and to put the data in a form from which actual permeabilities can readily be determined.

BRIEF DESCRIPTION OF THE DRAWINGS

For a better understanding of the invention, reference may be made to the following detailed description of [a] representative [embodiment] *embodiments,* taken in conjunction with the figures of the accompanying drawings in which:

FIG. 1 is a schematic diagram of suitable apparatus for investigating the permeability of earth formations traversed by a borehole in accordance with the present invention; and FIG. 2 is a top view of the apparatus, taken along the line 2—2 of FIG. 1 and looking in the direction of the arrows; and FIG. 3 is a detail elevation view of the logging device of the apparatus, taken along the line 3—3 of FIG. 1 and looking in the direction of the arrows.

DESCRIPTION OF [A] REPRESENTATIVE [EMBODIMENT] *EMBODIMENTS*

Referring particularly to FIG. 1, representative apparatus for investigating the permeability of subsurface earth formations in accordance with the invention is shown disposed in an uncased bore hole 10 traversing a subsurface earth formation 12 and containing a bore hole fluid 14. The bore hole apparatus may include a sonic well tool 16 supported by a cable 18 and may be raised and lowered in the bore hole by conventional winch means (not shown) located at ground level.

The sonic well tool 16 comprises an elongated housing 20 having a logging device 22 for engaging the surface of the formation 12 and means, such as the diametrically disposed, wall-engaging bow spring 24, for resiliently urging the housing 20 and the logging device 22 toward the opposite bore hole wall to hold the logging device 22 in firm engagement with the surface of the formation.

The logging device 22 (FIG. 2) preferably conforms generally to the contour of the bore hole wall and is supported on the housing 20 by extensible members 26 so as to be selectably movable between an outboard, wall-engaging position and an inboard, retracted position. In the illustrative embodiment shown, the logging device is maintained at the inboard position during movement of the tool 16 in the borehole and is caused to be extended from the housing into engagement with a formation to be tested by activation of a hydraulic system, for example, from the ground surface.

Sonic generating means 28 (FIG. 3), such as an hydraulic transducer, is mounted on the outer face of the logging device 22 and is adapted to be brought into contact with the adjacent surface of the formation. The generating means 28 may be energized by a suitable source of electrical energy 30 (FIG. 1) located at the ground surface and connected to the generator through a conductor 32 carried by the cable 18. Electrokinetic potentials resulting from the fluid flow created in the formation by the applied sonic energy are detected by a system of electrodes mounted on the logging device 22 and including a center electrode 34, a common electrode 36 and at least one outer electrode 38 spaced from the center electrode. *To exclude DC signals, capacitors are preferably inserted in the leads connected to the respective electrodes, as disclosed in the patent to Doll identified above.* The electrodes 34, *36* and 38 are *mechanically uncoupled from the transducer 28 and* connected through conductors 40, *42*, 44, respectively, in the cable 18 to suitable indicating and recording apparatus 46 at the surface of the earth. [A phase meter] *Amplitude and phase detection apparatus* 48 may be interposed between the apparatus 46 and the electrodes for a purpose hereinafter described.

[The center electrode 34 is mounted close enough to the transducer 28 to detect the large streaming potential pulses created by the periodic compression of the formation surface by the applied sonic energy. On the other hand, the outer electrode 38 is spaced sufficiently distant from the transducer 28 so that it detects only the electrokinetic potentials caused by the motion of the formation fluid.] *The center electrode 34 is mounted close enough to the transducer 28 to detect relatively large streaming or electrokinetic potential pulses created by the alternating motion of the formation fluid which results from the periodic compression of the formation surface by the applied sonic energy. On the other hand, the outer electrode 38 is farther from the transducer 28 and detects smaller streaming or electrokinetic potential pulses created by the alternating motion of the formation fluid which results from the periodic compression of the formation surface by the applied sonic energy.* To this end, the spacing between the outer electrode 38 and the transducer 28 should be large in comparison with the electrokinetic skin depth of fluid flow in the formation. Since the skin depths of commercially valuable formations are quite small, a typical value being several centimeters, the desired electrode spacing can easily be achieved on presently available well tools.

In operation, the well tool 16 is positioned opposite a formation to be investigated, the logging device 22 is extended into engagement with the formation surface and the transducer 28 is activated to excite the formation. In accordance with the invention, the frequency of excitation is low and typically within the range of from 20 to 500 c.p.s. Thereafter, and while the formation is being excited, the magnitudes *or phases* of the streaming [potential pulses and the resultant] *or* electrokinetic potentials are detected by the center electrode 34 and the outer electrode 38, respectively, referenced to an arbitrary point through the electrode 36 and recorded by the indicating and recording apparatus 46. So that reliable indications of the several potentials are obtained, measurements should be made continuously over a *long enough time: e.g., a* 4 to 5-cycle period of excitation. Moreover, as the electrokinetic skin depths are dependent upon the frequency of the applied sonic energy, measurements of the potentials are preferably made at a plurality of separate frequencies at each depth in the bore hole at which a formation is tested. In addition, the permeability at one depth can be determined relative to that at another depth through an observation of the frequency ratio at the two bore hole depths within the bore hole necessary to achieve the same skin depth.

Turning again to measurements at one bore hole depth, the ratios of the magnitude of the potentials at the outer electrode 38 to that of the [streaming pulses] *potentials* at the electrode 34 are then determined to obtain indications of the rate of fall-off in fluid velocity in the formation. Although the potential ratios can be calculated manually, they preferably are determined by suitable automatic calculating apparatus, as by an analog or digital computer, for example, which conveniently can be operatively connected to the indicating and recording apparatus 46. The data thus generated are then compared with similar data from formations of known permeability to obtain qualitative determinations of the relative permeability of the formation investigated.

It will be understood, of course, that any desired number of outer electrodes can be provided at spaced intervals along the surface of the logging device 22 and the data thereby provided conveniently compiled, for example, as a plot of the electrokinetic potentials measured at each electrode, and referenced to an arbitrary ground, against the distance from the center electrode. Such a presentation of the data greatly facilitates relative permeability studies.

Alternatively, the fluid flow rate data obtained by measuring the electrokinetic potentials can be indicated and recorded in terms of the electrokinetic skin depth of the formation, and suitable calculating apparatus can be operatively connected to the indicating and recording apparatus for this purpose. A significant advantage of developing the data in this form is that it makes possible the determination of the actual permeability of a formation, through a solution of the aforementioned skin depth equation, either manually or automatically, whenever the viscosity, density and sound velocity of the formation fluid and the porosity of the formation material are known. On the other hand, it also facilitates the development of [relative] *comparative* permeability data, such as, for example, [relative] *comparative* permeability logs of the formations traversed by a bore hole, by allowing ready comparison of the data with reference data from previously investigated formations.

If desired, measurements can be made through the use of [a phase meter] *amplitude and phase detecting apparatus* 48 of the phase of the generated electrokinetic potentials or of the phase displacement *or difference* between the applied periodic sonic energy and the periodic electrokinetic potentials at the outer electrodes to provide further information concerning the permeability of the formation material and to facilitate the determination of electrokinetic skin depth values. Alternatively, the [phase meter] *apparatus* 48 can be coupled to the generator 30 to provide a phase reference. A double-throw, single-pole switch may be used to connect the [phase meter] *apparatus* 48 selectively to either the conductor 40 or the conductor 44, depending on which electrode is under observation.

The presence of mud cake on the bore hole walls, as is typical of rotary drilled wells, does not have a [material] *very serious* effect on the results obtained by the methods of the present invention since the low-frequency sonic energy is still effective to compress the formation surface and thereby cause the periodic electrokinetic potentials to be created in the formation. Moreover, the mud cakes are typically very much less permeable than earth formations of commercial interest and, therefore, the electrokinetic skin depths associated with the movement of the mud filtrate through the cake are very small in comparison to the electrokinetic skin depths associated with the formation being investigated. In consequence, the major components of the [streaming potential pulses] *electrokinetic or streaming potentials* measured at the center electrode and of the [electrokinetic potentials] *electrokinetic or streaming potentials* measured at the outer electrodes are attributable to the movement of the formation fluid through the formation material. Again, indications of [relative] *comparative* permeability can be obtained by comparing the ratios of the measured potentials or phase displacements to similar values obtained from formations of known permeability that are also traversed by a mudded-off bore hole.

It will be understood by those skilled in the art that the above-described embodiment of the invention is intended to be merely exemplary, and that it is susceptible of modification and variation without departing from the spirit and scope of the invention. For example, other means may be employed for applying sonic energy to a formation surface, such as, for example, an electroacoustical transducer apparatus of the type disclosed in the prior art U.S. Pat. No. 3,138,219. All such variations and modifications, therefore, are included within the scope of the invention as set forth in the appended claims.

I claim:

1. A method for investigating the permeability of earth formations traversed by a bore hole and containing a fluid in the pores thereof comprising:

positioning a source of periodic mechanical excitation in contact with the surface of the bore hole within a formation to be investigated, actuating the source to periodically excite the formation at the area of contact between the formation and the excitation source so as to cause periodic electrokinetic potentials of relatively large magnitude to be produced at the contact area and [separate, periodic electrokinetic potentials] of proportionally smaller magnitude to be produced at locations spaced from the contact area, simultaneously with excitation of the formation measuring the magnitude of the relatively large electrokinetic potentials [at] *near* the contact area and the magnitude of the proportionally smaller electrokinetic potentials at at least one other location spaced from the contact by a distance large relative to the electrokinetic skin depth of the formation, and determining the ratio of the magnitude of the electrokinetic potentials at each other location to the magnitude of the electrokinetic potentials [at] *near* the contact area, said ratio being an indication of the permeability of the formation.

2. A method according to claim 1 further comprising:

sequentially exciting the formation at a plurality of separate frequencies, measuring the magnitude of the relatively large electrokinetic potentials [at] *near* the contact area and the magnitude of the proportionally smaller electrokinetic potentials at at least one other location spaced from the contact area by a distance large relative to the electrokinetic skin depth of the formation at each separate frequency of excitation, and determining the ratio of the magnitude of the electrokinetic potentials at each other location to the magnitude of the electrokinetic potentials at the contact area at each separate frequency.

3. A method according to claim 2 in which the frequencies at which the formation is excited are within the range of from 20 to 500 c.p.s.

4. A method for investigating the permeability of earth formations traversed by a bore hole and containing a fluid in the pores thereof comprising:

positioning a sonic transducer in contact with the surface of the bore hole within a formation to be investigated, actuating the transducer to periodically excite the formation at the area of contact between the transducer and the formation so as to cause periodic electrokinetic potentials of relatively large magnitude to be produced at the contact area and [separate, periodic electrokinetic potentials] of proportionally smaller magnitude to be produced at locations spaced from the contact area, simultaneously with excitation of the formation measuring the magnitude of the relatively large electrokinetic potentials [at] *near* the contact area and the magnitude of the proportionally smaller electrokinetic potentials at at least one other location spaced from the contact area by a distance large relative to the electrokinetic skin depth of the formation, and determining the ratio of the magnitude of the electrokinetic potentials at each other location to the magnitude of the electrokinetic potentials [at] *near* the contact area, said ratio being an indication of the permeability of the formation.

5. A method according to claim 4 further comprising:

sequentially exciting the formation at a plurality of separate frequencies, measuring the magnitude of the relatively large electrokinetic potentials [at] *near* the contact area and the magnitude of the proportionally smaller electrokinetic potentials at at least one other location spaced from the contact area by a distance large relative to the electrokinetic skin depth of the formation at each separate frequency of excitation, and determining the ratio of the magnitude of the electrokinetic potentials at each other location to the magnitude of the electrokinetic potentials [at] *near* the contact area at each separate frequency.

6. A method according to claim 5 in which the frequency at which the formation is excited is within the range of from 20 to 500 c.p.s.

7. Apparatus for investigating the permeability of earth formations traversed by a bore hole and containing fluid in the pores thereof comprising:

a source of periodic mechanical excitation, means for positioning the excitation source in contact with the bore hole wall within a formation to be investigated, means for actuating the source to periodically excite the formation at the area of contact between the source and the bore hole wall so as to cause periodic electrokinetic potentials of relatively large magnitude to be produced at the contact area and [separate, periodic electrokinetic potentials] of a proportionally smaller magnitude to be produced at locations spaced from the contact area, means for measuring the magnitude of the relatively large electrokinetic potentials [at] *near* the contact area and the magnitude of the proportionally smaller electrokinetic potentials at at least one other location spaced from the contact area by a distance large relative to the electrokinetic skin depth of the formation during excitation of the formation, and means for determining the ratio of the magnitude of the proportionally smaller electrokinetic potentials at each other location to the magnitude of the relatively large electrokinetic potentials [at] *near* the contact area, said ratio being an indication of the permeability of the formation.

8. Apparatus according to claim 7 in which the source of periodic mechanical excitation comprises a sonic transducer.

9. Apparatus according to claim 8, in which the sonic transducer is adapted to produce excitation frequencies within the range of from 20 to 500 c.p.s.

*10. A method of investigating the permeability of earth formations traversed by a bore hole and containing a fluid in the pores thereof comprising:*

*positioning a source of periodic mechanical excitation in contact with the surface of the bore hole within a formation to be investigated,*

*actuating the source to periodically excite the formation at the area of contact between the formation and the excitation source so as to cause periodic electrokinetic potentials to be produced in the formation, said potentials having different amplitudes and phases at different distances from the contact area, the differences in said amplitudes and phases depending on the permeability of the formation,*

*supplying to amplitude and phase detection apparatus signals respectively representing at least one of (a) the amplitudes and (b) the phases of said potentials at different points in said formation at which the amplitudes and phases of said potentials are different, and*

*effecting measurement by means of said amplitude and phase detection apparatus of at least one of (a) the amplitude ratio of and (b) the phase difference between said signals, said measurement being an indication of the permeability of the formation.*

*11. Apparatus for investigating the permeability of earth formations traversed by a bore hole and containing a fluid in the pores thereof comprising:*

*a source of periodic mechanical excitation,*

*means for positioning the excitation source in contact with the bore hole wall within a formation to be investigated,*

*means for actuating the source to periodically excite the formation at the area of contact between the source and the bore hole wall so as to cause periodic electrokinetic potentials to be produced in the formation, said potentials having different amplitudes and phases at different distances from the contact area, the differences in said amplitudes and phases depending on the permeability of the formation,*

*amplitude and phase detection apparatus, and*

*means for supplying to the amplitude and phase detection apparatus signals respectively representing at least one of (a) the amplitudes and (b) the phases of said potentials at different points in said formation at which the amplitudes and phases of said potentials are different,*

*said amplitude and phase detection apparatus effecting measurement of at least one of (a) the amplitude ratio of and (b) the phase difference between said signals, said measurement being an indication of the permeability of the formation.*

References Cited

The following references, cited by the Examiner, are of record in the patented file of this patent or the original patent.

UNITED STATES PATENTS

| | | | |
|---|---|---|---|
| 2,433,746 | 12/1947 | Doll | 324—1 |
| 2,814,017 | 11/1957 | Doll | 324—1 |
| 2,965,838 | 12/1960 | Kister | 324—1 |
| 2,974,273 | 3/1961 | Vogel et al. | 324—1 |
| 3,002,148 | 9/1961 | Nall | 324—1 |
| 3,075,142 | 1/1963 | Albright et al. | 324—1 |
| 3,116,449 | 12/1963 | Vogel | 324—10 X |
| 3,268,801 | 8/1966 | Clement et al. | 324—10 |

GERARD R. STRECKER, Primary Examiner

U.S. Cl. X.R.

324—10